June 15, 1943.  G. KEINATH  2,321,605
MEASURING SYSTEM
Filed March 21, 1941  2 Sheets-Sheet 1

INVENTOR.
GEORGE KEINATH.
BY Knight Brothers
ATTORNEYS.

June 15, 1943.                G. KEINATH                2,321,605
                           MEASURING SYSTEM
                        Filed March 21, 1941            2 Sheets-Sheet 2

INVENTOR.
GEORGE KEINATH.
BY Knight Brothers
ATTORNEYS.

Patented June 15, 1943

2,321,605

UNITED STATES PATENT OFFICE 2,321,605

MEASURING SYSTEM

George Keinath, Larchmont, N. Y.

Application March 21, 1941, Serial No. 384,489

15 Claims. (Cl. 171—95)

My invention relates to electric measuring systems in which a mechanism for indicating, recording, signalling or control purposes is actuated in accordance with a variable control magnitude and by means of an automatically operating circuit arrangement.

It is known to provide such systems with a balanceable network as represented by a Wheatstone bridge, a potentiometer circuit or the like. These networks have a zero instrument or zero relay, variable circuit means for supplying the primary control magnitude, and an adjustable impedance member for compensating the effect of the variable circuit means on the zero relay. A departure of the control magnitude from a datum value causes the balance of the network to be disturbed so that the zero relay deflects from its position of rest. As a result, the relay energizes the circuit of drive means which in turn control the adjustable impedance member of the measuring network so as to reestablish the balance condition. When the network is balanced, a condition which the system tends to maintain automatically, the adjustment of the impedance member and of any indicating, recording or control device coupled therewith, corresponds to the primary control magnitude. Self-balancing measuring systems of this known type are applicable for various measuring and control purposes, for instance for indicating and recording variable pressure, temperature, voltage and current magnitudes, for automatically controlling furnaces and other devices, in summary for determining, signalling, indicating, recording, or using for control purposes any variable magnitude of electrical nature or convertible into a variation of such nature and apt to effect the balance of the above-mentioned measuring network.

There are, however, some limitations attached to these known systems. First, the automatic control of the adjustable impedance is relatively sluggish. Customary recorders, for instance, require an adjusting period of about one or several seconds. This renders it impossible to use the system when fast-changing magnitudes are to be recorded. Secondly, the accuracy and reliability of the known systems is limited. This is partly also due to the relatively long time necessary for the automatic follow-up adjustments. Furthermore, many of the known systems of the type here in point are too complicated and sensitive for many purposes and, when designed for one purpose, do not lend themselves easily for other purposes. For instance, some known systems operate for D. C. measurements only; others do not easily permit operations involving wattmetric measurements.

It is an object of my invention to provide an electric system which is applicable for purposes of the above-mentioned kind, yet superior to the known systems by reducing or avoiding one or several of their disadvantages.

More specifically, an object of the invention is to increase the field of applicability and to improve the accuracy of measuring systems for such purposes as here referred to.

Another object, related to the foregoing, is to provide a measuring system for indicating, signalling, recording, control or the like purposes, with a self-balancing network whose automatic adjustment, so as to perform the desired operation, requires less time than in the above-described systems. For instance, the invention aims at reducing this adjusting time to periods in the order of fractions down to one or a few tenths of one second or less.

Other objects of my invention deal with the provision and improvement of indicating means, applicable in systems of the type here of interest. An object, in this respect, is to afford an indication not only of the instantaneous value of the primary magnitude to be determined, but also the tendency of variation or the rate of change of this magnitude.

A further object is concerned with providing an improved mechanism of relatively simple construction for control and regulating purposes, such as the control of the temperature in rooms or furnaces or the control of manufacturing operations, so as to effect an automatic selection from two or more possible control operations dependent upon the instantaneous value of the variable primary control magnitude. A more specific object here pertinent is to afford an adjustment at will or responsive to control magnitudes other than the one aforementioned, of the control mechanism thereby modifying the course or datum value of the control operation.

Still further objects of the invention relate to rendering the measuring system applicable, with relative ease and by simple and reliable means, for various requirements as regards the nature of the available primary control impulse or the nature of the available current source for energizing the system. To elucidate, it is aimed at making it possible to use substantially the same system for primary control magnitudes representing a voltage or current intensity or an electric energy, for measuring D. C. magnitudes or A. C. magnitudes in single-phase or multiphase circuits.

According to my invention, in one of its aspects, an electric system for indicating, signalling, recording or control purposes, is constructed as follows. The system contains a circuit arrangement which includes the circuit means for providing the variable magnitude to be determined, transmitted or used as pilot magnitude of a desired control operation. This variable magnitude, for simplicity sake, is called "primary control magnitude" in the following description as well as in several of the claims. The circuit arrangement also contains a measuring instrument or the like designed as a relay, and an adjustable impedance member. The relay is subject to the effect of the circuit means varying in accordance with the primary control magnitude as well as to the effect of an impedance variation of the adjustable impedance member. Consequently, any deviation of the primary control magnitude from a datum value requires a corresponding definite variation of the adjustable impedance member in order to reestablish the previous circuit conditions as regards the relay. The system further contains drive means which vary the adjustment of the impedance member periodically over a range including those adjustments which may become necessary to compensate for any utilizable variation of the primary control magnitude. Hence, the impedance member passes repeatedly through the compensating adjustment when actuated by the drive means. Another element of the system is a mechanism to be controlled in accordance with the primary control magnitude. This mechanism has a movable member actuated periodically in a given relation to the periodic adjustment of the impedance member so that each position assumed by the movable member during its travel corresponds to one definite impedance value of the adjustable impedance member. As a result, at the moment when the adjustable impedance passes through the compensating adjustment, the movable member of the mechanism goes through a position which is also indicative of the compensating condition and hence corresponds to the instantaneous value of the primary control magnitude. The relay is connected with the periodically movable member of the mechanism by an impulse-transmitting circuit and causes this circuit to pass an impulse to the movable member at the moment when the relay responds to a given current condition in the network. Since at the same moment the movable member is at a point of its travel which corresponds to the primary control magnitude, the periodic indications or control operations effected by the energization of the movable member are in accordance with the variations of the primary control magnitude.

In another aspect of the invention, the circuit arrangement of a system organized as described in the foregoing, is designed as a balanceable network, the measuring device or relay forming the zero instrument of the network. A network of the type of a Wheatstone bridge may be used having the relay located in the bridge diagonal or zero branch. According to another modification, the circuit arrangement contains two substantially separate circuits, one supplying the primary control magnitude to a relay and the other containing the adjustable impedance member, for instance in a potentiometer connection, and supplying a compensating magnitude to the same relay so that the zero balance is effected not in a single circuit branch but in the relay, a differential type relay being appropriate for this purpose.

The periodic adjustments of the impedance member and the movable mechanism member need not necessarily be of equal speed or equal rate of change so long as their relation to each other is univocal, and there are occasions where different speeds or different paths of movement or rates of change are advantageous. However, according to another and more specific feature of the invention, the two members are operated synchronously with equal or proportional rectilinear or angular speed, for instance by connecting them mechanically with each other or with a common drive.

The foregoing and other objects and features of the invention will become apparent from the following description of several embodiments of the invention exemplified by the drawings in which, Fig. 1 shows diagrammatically an indicating direct current system;

Fig. 2 shows a sectional view through a somewhat modified form of the indicating and adjusting mechanism of the system shown in Fig. 1, and Fig. 3 a partial front view of the mechanism of Fig. 2;

Fig. 4 illustrates an alternating current system for recording purposes, Fig. 5 represents an alternating current system for measuring an electric energy and effecting an indication, signal transmission, recording or control in dependence upon a wattmetric magnitude;

In order to indicate the relationship between the different embodiments and to facilitate describing their details, the following general markings are used in the figures:

The indicating, recording or control mechanism to be governed by a primary control magnitude is marked in Figs. 1, 4, 6 and 7 with the letter A.

Figures 1, 2, 3, 4, 5:
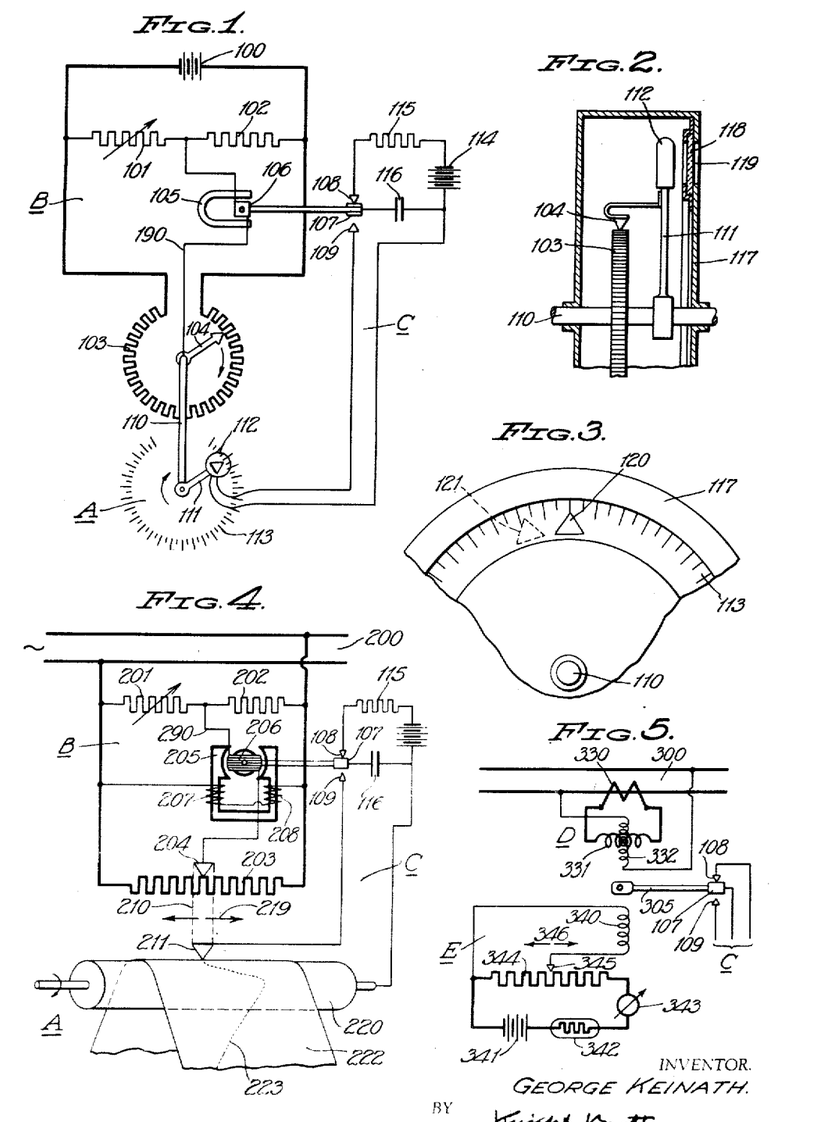
Figure 7:
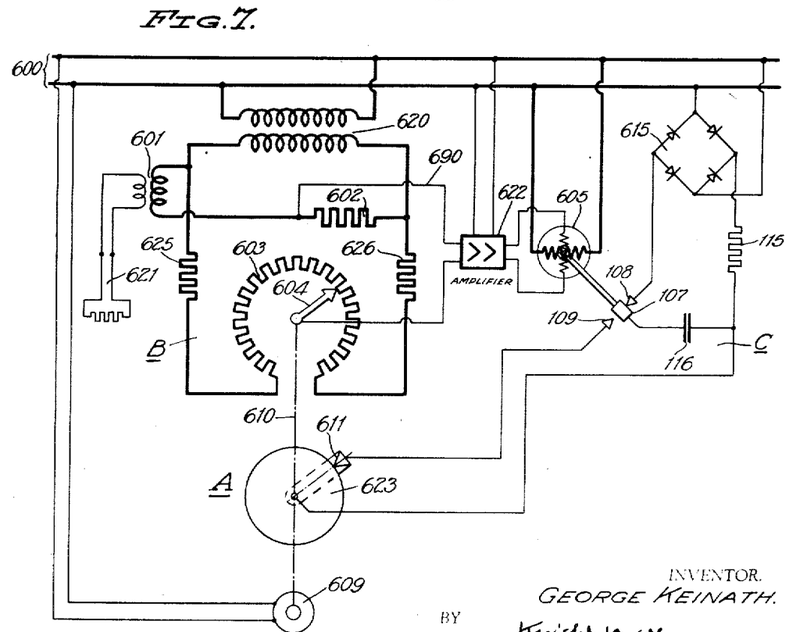
Fig. 7 shows a system of more elaborate design for indicating or recording temperature variations, in particular, of the blood temperature.

The letter B in Figs. 1, 4 and 7 indicates measuring networks containing the circuit element for supplying the primary control magnitude, the adjustable impedance and a zero instrument, these networks B being of the bridge type and having a measuring instrument or relay connected in their bridge diagonal or zero branch.

The impulse-transmitting circuit, connecting the relay of the circuit arrangement with the movable member of the mechanism to be controlled, is denoted by C. For simplicity sake, similar control circuits C are shown in Figs. 1 and 4 through 7, having their respective circuit elements indicated by the same reference numerals.

Figure 6:
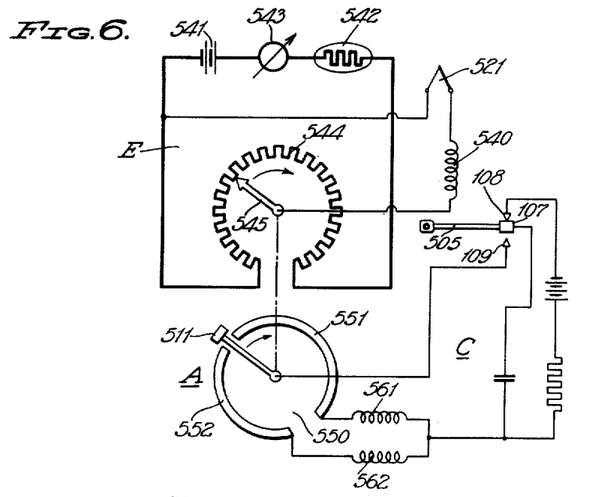
Fig. 6 illustrates the circuit diagram of another system operating with direct current and serving to control an apparatus, for instance an electric furnace, in dependence upon temperature variations.

The circuit arrangement of the system shown in Fig. 5 does not form a Wheatstone bridge but contains a dynamometric relay circuit D and a compensating or potentiometer circuit E in type similar to the circuit E in Fig. 6.

Reverting to Fig. 1 of the drawings, the measuring network B contains a direct current source 100, a variable circuit means 101 represented as a variable resistor for furnishing the primary control magnitude. This circuit means may consist of a resistance thermometer if the system is to be used for measuring and indicating variable temperatures. For similar purposes, a thermo-element may also be employed. The bridge network B in Fig. 1 also contains an impedance 102, for instance a resistor of constant resistance value, and, further, a rheostat 103 having a rotary slide contact 104 connected with the zero or diagonal branch 190 of the bridge network. A moving coil instrument 105, having its moving coil 106 series connected in the zero branch 190, serves as a zero instrument and has its movable pointer provided with an intermediate contact 107 cooperating with stationary contacts 108 and 109 for controlling the impulse-transmitting circuit C. The indicating mechanism A contains a rotary indicator member 111 which is coupled with the slide contact 104 by means of a driving shaft 110. This shaft is actuated by motoric means (not shown) so as to rotate contact 104 and indicator member 111 in synchronism with each other and preferably with constant angular speed. The indicator 111 carries an electric illuminating means for producing light flashes, for instance a glow discharge bulb 112, which forms the pointer of the indicator and moves over a circular scale 113 indicating the magnitudes to be measured. The bulb 112 is connected with the impulse-transmitting circuit. This circuit contains a current source 114, a resistor 115 and a condenser 116 so connected with the bulb 112 and the relay contacts 107, 108 and 109 that the condenser 116 is charged by the current source 114 when the bridge network is unbalanced and the intermediate contact 107 in engagement with contact 108. At the moment when the slide contact 104 passes through the point of its periodic travel where the zero branch 190 is balanced, the relay 105 is deenergized so that the contact 107 interrupts the circuit of battery 114 and engages the contact 107 thereby discharging the condenser 116 through the light bulb. The interruption of the battery circuit occurs without sparking because the condenser is charged and has stopped the current flow before the contacts 107 and 108 are opened. The indicator member 111, at the time when the light flash occurs, has an instantaneous position relative to the scale 113 which corresponds to the primary control magnitude to be determined. If the driving shaft 110 is operated with sufficient speed, for instance so as to complete a rotation within a fraction of a second, a number of indicating light flashes follow one another within a short period thus conveying the appearance of a practically continuous indication of the magnitude to be determined and of any variation of this magnitude occuring during the measuring interval.

Fig. 2 exemplifies a construction of the indicating mechanism A and the adjustable rheostat. In Fig. 2, the indicator member 111 mounted on the driving shaft 110 serves also as a carrier for the slide contact 104 proper. This contact engages the periphery of the annular rheostat 103 which is stationary. The glow discharge bulb 112 is mounted at the end of the indicator member 111. The arrangement is enclosed by a casing 117 having a circular slot 119 covered by a transparent plate 118. This plate is provided with the scale 113 as is apparent from the front view shown in Fig. 3. The bulb 112 is preferably provided with a diaphragm so as to give the light flash a definite and pointed shape. For instance, the shape of a triangle may be used so that the light flash effects an indication as represented in Fig. 3 by mark 120.

The above-described indicating system permits also an indication of the tendency of variation of the primary control magnitude and also an indication of the rate of change of this variation. A constructively simple method, according to the invention, for obtaining this result is to provide the transparent cover plate 118 (Fig. 2) with luminous substance. Due to the property of such substance to emit light of abating intensity after the illumination of the substance has ceased, an indicating mechanism thus designed shows not only an indicating light flash of high intensity (120 in Fig. 3) but also one or more abating light indications, such as 121 in Fig. 3, originating from preceding illuminations. The position of these other flashes of smaller intensity indicates whether the tendency of the variations to be determined is positive or negative, and the distance of the abating light flashes from the flash of greatest intensity is a measure of the rate of change of the variations. In other words, if the previous indication is farther away on the scale from the last indication, the primary control magnitude varies with greater speed than if the preceding and the last light flash are more closely together. If a sufficient speed of the periodic operation is provided, more than two indications can be made to appear simultaneously on the scale so that the tendency and rate of change of the variable magnitude are still more clearly indicated.

It will be obvious from the foregoing description that any other suitable measuring network may be used instead of the particular bridge arrangement shown in Fig. 1. The impulse-transmitting circuit C may also be designed in various ways. For instance, it suffices if the relay 105, when responding to balance conditions, connects the indicating mechanism with any current source suitable for properly energizing the indicating mechanism.

The relay to be used in systems according to the invention is preferably designed as a sensitive measuring instrument and provided with a quick-acting contact assembly requiring a very small deflection. Contacts with pointed pole ends are especially suitable. The impedance member 103, while shown as an annular rheostat with a rotating slide contact, may also be of the linear type having an oscillating slide contact; it may consist, for instance, of a simple straight wire or a uniformly wound toroid. Rheostats formed of an un-uniformly wound toroid, or having a large number of contact laminations with resistance coils between them, are also applicable, in particular, if it is desired to obtain an indication, record or control in accordance with a desired law, for instance an indication on a logarithmic scale. The impedance member may also consist of a variable inductance, such as a variometer or a variable condenser. The variable control magnitude may also be supplied by a variable voltage source. These possibilities will be more fully understood from the embodiments described hereinafter.

According to the system illustrated in Fig. 4, the bridge network B is connected with an alternating current source 200 and contains the variable impedance 201, for instance a resistor, capacitor or inductance coil, for supplying the primary control magnitude. 202 is an impedance of constant magnitude, and 203 the adjustable impedance member consisting of a rheostat and having a slide contact 204 connected with the zero branch 290 of the bridge. The zero instrument of this A. C. arrangement is a dynamometric relay 205. Its moving coil 206 is connected in the zero branch 290, and its field coils 207 and 208 are connected with the current source 200 so as to be energized in a desired phase relation with respect to the cycle of the current source, this phase relation depending upon the intended measuring purpose of the system. If the variable circuit means 201 and, accordingly, the constant circuit means 202 are ohmic resistors, as is the case for temperature measurements, the field produced by coils 207 and 208 should be in phase with the voltage and hence with the current in the zero branch 290. However, it suffices if the in-phase energization is approximate, because any deviation in this respect affects only the sensitivity but not the accuracy of measurement.

A relay of the type shown in Fig. 4 has the advantage that it permits a large number of different measuring problems in a very simple manner. For instance, this arrangement allows measuring the loss angle of condensers. In this case, the phase position of the current in the field coils of the zero relay must be adjusted and maintained very accurately. The arrangement may also be used for measuring the capacity of condensers. In this case, the adjustment of the phase difference between the field in the zero instrument and the voltage or current in the bridge diagonal need not be as accurate. For instance, a phase error of 5° amounts to only 0.5% error in the capacity measurement.

The recording mechanism proper contains a metallic transport roller 220 for actuating a paper chart 222 with constant speed. The recorder has a movable member 211 which is connected with the movable contact 204 of the adjustable resistor 203 by drive means indicated by broken lines and marked 210. The drive means cause the contact 204 and the movable member 211 to reciprocate simultaneously in the direction of the arrows 219. The contacts 107, 108 and 109 of the zero relay are connected through the impulse-transmitting circuit C with the movable member 211 and the roller 220 respectively.

At the moment when the reciprocatory contact 204 passes through the point of its travel where the zero branch is balanced, the relay transmits a discharge impulse through the circuit C and thereby causes a flow of current between the electrodes formed by the movable member 211 and the transport roller 220. This discharge current acts electrolytically on the chemically treated paper of the recording chart, and produces a mark at the point of member 211. The marks produced by a series of discharges form a curve, such as exemplified by 223, indicating the changes of the primary control magnitude to be measured.

It will be understood that the electrochemical recorder above described is mentioned merely as an example. Other recording means, in particular spark recorders, may be used instead.

When varying the adjustment of the impedance member and correspondingly actuating the movable member of the indicating, recording or control mechanism in a reciprocatory manner as exemplified by Fig. 4, the recording, indicating or the like operation of the mechanism must be blocked when the movable elements effect their return movement, because the circuit means illustrated in the foregoing examples are not designed for properly energizing the mechanism in both directions of its movement. However, it is relatively simple to design such a reciprocatory system so as to effect a proper operation of the mechanism when moving in both directions of its reciprocatory travel. This can be obtained, for instance, by providing a circuit arrangement with a commutating switch which places the relay and impulse-transmitting circuit in proper operating condition, depending upon the direction of movement of the movable members. The frequency of the periodic indications may thus be doubled.

Some magnitudes, for instance an electric power, cannot be easily measured by means of a bridge network. For such cases I prefer using a circuit arrangement which also represents a zero method but contains a so-called compensating circuit. The systems shown in Figs. 5 and 7 are examples of such type.

Fig. 5 represents a system operating in response to variations of an electric energy. The movable member of the zero instrument 305 is again designed as a relay and serves to control the impulse-transmitting circuit C. This relay 305 is acted upon by two circuits D and E. The circuit D includes two wattmetric energizing coils 331 and 332 of the relay 305. Current coil 331 is energized by a transformer 330 in accordance with the current in the alternating current source 300, and the winding 332 is energized in accordance with the voltage of the current source. The circuit E contains a direct current source 341 feeding a potentiometer 344 with a constant current intensity through an automatic current-regulating device 342 and an ammeter 343. The slide contact 345 of the potentiometer is connected with a separate control coil 340 of the relay 305, and is reciprocated as indicated by the arrow 346.

The system also contains a mechanism for indicating, recording or control purposes, having a movable member actuated in a given relation, preferably in synchronism with the slide contact 345. The mechanism is connected with the impulse-transmitting circuit C and may be designed similar to any of the mechanisms shown in Figs. 1 through 4, 6 and 7. Hence, the operating mechanism proper is not illustrated in Fig. 5.

The relay 305 represents a differential apparatus responding to the effects of both the dynamometric circuit arrangement D and the compensating circuit E. If the deflecting torque exerted by the compensating coil 340 is equal or in a predetermined relation to the deflecting torque exerted by the dynamometric arrangement D, the relay 305 is balanced and causes the circuit C to transmit a control impulse through the mechanism to be actuated. Consequently, the circuit arrangement of this system, viewed as a whole, also represents a balanceable arrangement operating according to a zero method, although the balance is not effected in any single circuit but occurs within the differential relay.

A circuit arrangement of the type exemplified by Fig. 5 is, of course, not limited to the measurement of energy magnitudes but is also applicable for any other control or measuring magnitude, such as pressure or flow conditions, voltages or current intensities. An example of the latter type, which also embodies some other modifications of the invention, is shown in Fig. 6. More particularly, Fig. 6 also exemplifies a system according to my invention which is applicable and especially advantageous for control purposes, for instance the automatic temperature control of a furnace.

It has been attempted for years to provide high sensitive contact instruments for control purposes. However, the control systems so far available to industry are not completely satisfactory. One of the control systems now in use has a rather complicated and voluminous design and operates with great sluggishness. The adjusting period required by this known apparatus is not less than five seconds. Another type of control apparatus now on the market operates according to a deflection method and requires a high-frequency generator for effecting a capacitive transmission of the control impulses. These apparatus are also relatively intricate and, due to the deflection principle as contrasted with a zero or balancing method, the control operation is of limited accuracy.

According to the feature of my invention exemplified by Fig. 7, a control system is provided which requires relatively small space, operates with high accuracy by permitting the application of a zero or balancing method, and can be operated with an extremely small adjusting period so as to be capable of following relatively fast-changing control magnitudes.

The control system according to Fig. 6 contains a measuring network E of the compensating or potentiometer type. The circuit contains a current source 541 supplying a constant current. 543 is an ammeter and 542 a current-regulating device such as in iron filament resistors. A rheostat 544 is connected with the current source and has a slide contact 545 connected with a thermoelement 521 and the control coil 540 of a relay 505. The thermoelement 521 represents the temperature feeler of the control system and is subjected, for instance, to the temperature in an electric furnace to be regulated. The relay coil when energized closes the contacts 107 and 108 as illustrated.

The control mechanism proper has a rotatable electrode member 511 which is connected with the slide contact 545 of the rheostat 544 so as to be controlled in synchronism therewith. The control mechanism further contains an insulating body 550 of cylindric shape carrying two circular contact segments 551 and 552. The contact member 511, when rotating, moves sequentially over the contact members 551 and 552. The segments 551 and 552 are connected with the coils 561 and 562 whose other ends are connected with each other and with the impulse-transmitting circuit C. The two coils 561 and 562 represent the main relay for controlling the electric furnace. Coil 561, for instance, when energized, interrupts the furnace current, while coil 562, when energized, supplies heating current to the furnace.

The slide contact 545 and the movable contact member 511 are rotated in synchronism with each other. During each cycle of its rotation, the slide contact 545 passes through a potentiometer position where the voltage produced by the temperature feeler 521 is compensated by a counter-voltage derived from the current source 541. In this movement, the zero branch 590, containing the relay coil 540, is free of current so that the coil 540 is deenergized. Consequently, in this moment the relay spring causes contact 107 to engage contact 109 and to energize the impulse-transmitting circuit. At the same time, the electrode or contact 511 of the control mechanism assumes a position relative to the stationary member 550 which corresponds to the compensating position of the slide contact 545. Fig. 6 shows the movable member 511 in a neutral position. At other moments of its movement, the member 511 is above one or the other of segments 551 or 552 so that the discharge of the control circuit occurs through member 511, one of the segments and the appertaining control coil 561 or 562. That is, if the temperature measured by the feeler 521 is above a datum value, the balance condition of zero branch 590 is obtained at a moment when the member 511 is above segment 551, so that the coil 561 is energized and interrupts the current supply to the furnace to be regulated. On the other hand, if the furnace temperature measured by the feeler 521 is below the datum value, the member 511 at the moment of balance is above segment 552 and causes the coil 562 to switch-in the current supply to the furnace.

According to another feature of the invention, the insulating carrier 550 with the contact segments 551 and 552 is adjustable angularly relative to the movable member 511. Such an angular adjustment has the effect of changing the location of the neutral position and thereby the datum value of the control operation. This renders it possible to select at will the temperature or other condition to be kept constant by the control system. The adjustment of the mechanism, as regards the datum value, may be effected manually or by automatic means. If automatic means are employed, the control operation is dependent not only on the variations of the above-mentioned primary control magnitude ($x$) but responds also to the variations of a second control magnitude ($y$).

Fig. 7 represents an alternating current system for recording purposes, in particular a system for the automatic recording over an extensive period of the blood or fever temperature of a patient. The current source of the system is designated by 600 and consists of mains to be connected to a customary utility network, for instance, by means of an ordinary plug-and-socket connection. The recording device contains a drum 623 to be covered with the recording chart and a movable member 611 rotating about the axis of the drum. This recording member is energized by means of an impulse-transmitting circuit C and contains an electrochemical writing device or a discharge electrode for producing a record by means of sparks. The movable member and the drum are automatically shifted relatively to each other in parallel to the drum axis, so that the movable member, aside from its rotation, travels lengthwise over the paper. The longitudinal (axial) movement of the drum, for the purpose here in view, is preferably effected with constant speed.

The primary magnitude for controlling the recorder is supplied by means of a thermometric device 621, preferably a resistance thermometer. This thermometer is attached to the body of the patient, for instance with the aid of a bandage. The resistance thermometer 621 is connected with the measuring network B by means of a transformer 601. Numerals 602, 625 and 626 designate resistances of substantially constant magnitude. The adjustable impedance member of the bridge network consists of a rheostat 603 having a rotary slide contact 604 connected with the zero branch 690 of the bridge arrangement. The network is connected with a step-down transformer 620 which has its input circuit connected with the current source 600. The slide contact 604 and the movable member 611 of the recorder are coupled with each other by a driving shaft 610 which is actuated by means of a motor 609, preferably of the synchronous type. The motor 609 is also fed from the current source 600. The zero relay 605 of this system is connected with the zero branch 690 through an alternating current amplifier 622 whose energy supply is derived from the same current source 600. The relay 605 is of the dynamometric type and has its stationary field coil connected with the current source 600. The impulse-transmitting circuit controlled by the relay 605 is similar to those of the other examples, except that its current source consists of a rectifier 615 also connected with the primary current source 600. However, it is also advantageous to connect the control circuit with the amplifier 622.

The operation of the system shown in Fig. 7 is substantially similar to that of the preceding examples.

While for the purpose of recording temperatures, in particular blood temperatures, the axial movement of the drum 623 is constant in time, a recorder of the type illustrated in Fig. 7 may also be designed as an x—y recorder so that the recorded magnitude is dependent upon the variations of two independent control magnitudes x and y, similar to the operation of the x—y control apparatus previously described in connection with Fig. 6. For x—y recording, the axial movement of drum 623 in Fig. 7 is effected by a drive which operates in dependence upon the second control magnitude (y) and varies its speed accordingly. According to another modification of the invention, an x—y recorder is so designed that the recording drum 623 is rotated with constant speed so as to perform one rotation for each recording operation of the movable member, while the latter is moved axially in response to the second control magnitude (y), for instance, by means of a parallel mechanism.

Measuring systems for signalling, indicating, recording or control purposes, according to the invention, are obtained with relatively simple means and afford a high accuracy and, if desired, a high speed of operation unaffected by vibrations, inconstancy of the current supply and the like disturbances. With respect to accuracy, it will be noted that the operation of the control relay is largely independent of the calibration or constancy of its return spring or other counter-force, due to the fact that the control operation is effected by a zero method. The accuracy of operation is also independent of the speed and uniformity of the motion with which the adjustable impedance member and the movable member are actuated. When using an amplifier between the relay and the measuring network proper, as is exemplified by Fig. 7, the control operation is virtually independent of the constancy of the amplification factor, again because the circuit arrangement operates according to a zero method. In alternating current systems as shown in Figs. 4 and 8, the operation is also largely independent of variations in the voltage or current intensity of the primary current source. In the arrangement of Fig. 7, for instance, no particular requirements are made as to the constancy of the voltage supplied by the transformer 620.

As apparent from the examples illustrated and described, the invention permits numerous modifications and may be carried out with additional or auxiliary circuits and devices. To mention a few further possibilities, it is obvious that a plurality of indicating, recording or control mechanisms may be connected with a single measuring network. Likewise, one and the same indicating, recording and control mechanism can be operated to respond alternately to different control magnitudes. For instance, a multiple recorder, having a recording chart and transport drum substantially as shown in Fig. 4, is obtained by providing the apparatus with a contact device which connects the measuring system cyclically with different measuring arrangements. The recording apparatus then indicates cyclically the different magnitudes to be measured and records several curves. In order to facilitate distinguishing between these different magnitudes, the discharges in the control circuit C are preferably of different intensity, or a single discharge, double discharge, etc., is cyclically produced, so that one magnitude is indicated by a single dot, another magnitude by a double dot, and so on. A multiple recorder can also be provided in an arrangement having a drum recorder of the type shown in Fig. 7. In the latter case, the slide contact 604 of the potentiometer and the movable recording member 611 are rotated over only a portion, for instance 90° or 120°, of a circle. Consequently, the recording of each magnitude is limited to for instance ¼ or ⅓ of the drum periphery. For recording the variations of the second, third, etc., magnitude, the recording device is cyclically switched over so as to produce corresponding records on the second, third, etc., portions of the drum. Simultaneous with this switching operation, the measuring system is connected with a different circuit to respond cyclically to four or three different primary control magnitudes. Similarly, when using a recorder with continuously moving recording charts, as exemplified by Fig. 4, the width of the chart may be subdivided into a plurality of bands, each serving to record a different magnitude, corresponding switching means being provided to effect a cyclic operation as described in the foregoing.

It is to be understood that when speaking in the foregoing of a periodic movement of the adjustable impedance and the indicating, recording or controlling member, I mean to include a continuous operation as well as an intermittent movement possessing, for instance, equal or unequal intervals of rest between the cycles of operation.

I claim:

1. In an electric system for effecting an indication in accordance with a variable control magnitude, a balanceable network comprising variable circuit means for supplying said control magnitude, an adjustable impedance member to establish balance conditions, and a balance-responsive control device, in combination with an indicating mechanism comprising a stationary scale and an indicator member movable relative to said scale and having illuminating means for producing flashes of light, drive means for periodically and simultaneously varying the adjustments of said impedance member and said indicator member in a given relation to each other and over a range including the balance adjustment of said network, and a control circuit controlled by said balance-responsive member and connecting it with said illuminating means to produce during the periodic travel of said indicator member a light flash at the point of said scale which corresponds to the position of balance of said impedance member.

2. In an electric system for effecting an indication in accordance with a variable control magnitude, a balanceable network comprising variable circuit means for supplying said control magnitude, an adjustable impedance member to establish balance conditions, and a balance-responsive control device, in combination with an indicating mechanism comprising a movable indicator member having illuminating means for producing flashes of light, drive means for periodically and simultaneously adjusting said impedance member and said indicator member in a given relation to each other and over a range of adjustment including the balance adjustment of said network, and a control circuit controlled by said balance-responsive member and connecting it with said illuminating means to produce during the periodic travel of said indicator member a light flash at a point which corresponds to the position of balance of said impedance member, and a stationary carrier extending along the path of travel of said illuminating means and provided with luminous substance to indicate by afterglow the tendency of variation of the magnitude to be indicated.

3. A measuring network comprising periodically operating circuit means for producing impulses indicative of a magnitude to be determined, in combination with an indicating mechanism having a movable indicator member coupled with said circuit means so as to move in a given relation to the periodic operation of said means, said indicator member having illuminating means electrically connected with said circuit means for producing flashes of light in accordance with said impulses at a point of the path of travel of said indicator member which corresponds to said magnitude to be determined, and a carrier extending along the path of travel of said illuminating means and provided with luminous substance to indicate by afterglow the tendency of variation of said magnitude.

4. In an electric system for effecting a control in accordance with a variable magnitude, a balanceable circuit arrangement comprising variable circuit means for supplying said magnitude, an adjustable impedance member to establish balance conditions, and a balance-responsive control device, in combination with a control apparatus comprising two control members, one having a plurality of contacts insulated from one another and said other control member being movable relative to said first control member to cooperate with any one of said contacts depending upon the position of said control members relative to each other, drive means for periodically moving said control members relative to each other and for simultaneously varying the adjustment of said impedance member over a range of adjustment including the balance position, a plurality of circuit elements to be controlled, said circuit elements being connected with said plurality of contacts respectively, and a control circuit connecting said balance-responsive control device with said movable control member for transmitting a control impulse to the contact located at the point of travel of said movable control member which corresponds to the position of balance of said adjustable impedance member thereby selecting for operation the circuit element connected with said latter contact.

5. In an electric system for effecting a control in accordance with a variable magnitude, a balanceable circuit arrangement comprising variable circuit means for supplying said magnitude, an adjustable impedance member to establish balance conditions, and a balance-responsive control device, in combination with a control apparatus comprising two control members, one having two contact segments and the other being movable over said contact segments to cooperate with either of them depending upon the relative position of said control members, drive means for periodically moving said control members relative to each other and for simultaneously varying the adjustment of said impedance member over a range of adjustment including the balance position, two windings for effecting the desired control proper with opposite control effects respectively, said windings being connected with said contact segments respectively, and a control circuit connecting said balance-responsive control device with said movable control member for causing it to pass a control impulse to the contact segment located at the point of travel of said movable control member which corresponds to the position of balance of said adjustable impedance member thereby selecting for operation the winding connected with said latter contact segment.

6. In an electric system for effecting a control in accordance with a variable magnitude, a balanceable circuit arrangement comprising variable circuit means for supplying said magnitude, an adjustable impedance member to establish balance conditions, and a balance-responsive control device, in combination with a control apparatus comprising two control members movable relative to each other, one having at least two contact segments and the other having a contact to cooperate with one of said segments depending upon the relative position of said control members, drive means for periodically moving one of said control members and simultaneously varying the adjustment of said impedance member over a range of adjustment including the balance position of said impedance member, said control member not subject to said periodic movement being shiftable relative to the driven control member to set the control members according to a desired control operation, at least two control windings for effecting the desired control proper, said windings being connected with said contact segments respectively, and a control circuit connecting said balance-responsive control device with said driven control member and said windings for passing a control impulse through the contact segment located at the point of the periodic travel of said driven control member at which said impedance member passes through its position of balance thereby selecting for operation the winding connected with said latter segment.

7. In an electric system for effecting a control in accordance with a variable magnitude, a balanceable measuring network comprising variable circuit means for supplying said magnitude, a balance-responsive control device, a variable balancing impedance member having rotary adjusting means for varying the impedance over a range including the balance adjustment, in combination with a control apparatus comprising two control members, the first being substantially stationary and having two insulated contact segments arranged in series along a circular path, the second control member being rotatable about said circular path to cooperate with either segment depending upon the position of said control members relative to each other, drive means for rotating said adjusting means and said rotatable control member in synchronism with each other, said first control member having said two segments being shiftable angularly with respect to said driven control member to set said control apparatus according to a desired control operation, two control windings for effecting the desired control proper, said windings being connected with said contact segments respectively, and a control circuit connecting said balance-responsive control device with said driven control member and said windings for passing a control impulse through the contact segment located at the point of the periodic travel of said driven control member at which said rotary adjusting means of said impedance member passes through its position of balance thereby selecting for operation the winding connected with said latter segment.

8. A measuring system for actuating a mechanism for indicating, recording, or control purposes, which comprises a measuring network having circuit means of an impedance to be determined, an adjustable impedance member, a measuring device responsive to the impedance magnitudes of said circuit means and said impedance member, in combination with an impulse-transmitting circuit including a condenser and a current source for charging said condenser, said mechanism to be actuated having two cooperative electrode members movable relative to each other and connected in said impulse-transmitting circuit, drive means for periodically varying the adjustment of said impedance member over an impedance range including the adjustment according to said given relation, one of said electrode members being coupled with said adjustable impedance member to move in synchronism with said periodic adjustment, contact means arranged for controlling said impulse-transmitting circuit and having a movable intermediate contact associated with said measuring device and two stationary outer contacts connected with said condenser and said current source respectively to discharge said condenser through said electrode members at the moment when the impedance of said impedance member and the relative position of said electrode members correspond to said given impedance relation and to charge said condenser in intermediate periods.

9. A measuring system for actuating a mechanism for indicating, recording, or control purposes, which comprises a balanceable measuring network having a zero branch, a zero instrument in said branch, circuit means having an impedance to be determined and an adjustable impedance member to balance the effect of said impedance to be determined on said zero branch, in combination with an impulse-transmitting circuit including a condenser and a current source for charging said condenser, said mechanism to be actuated having two cooperative electrode members movable relative to each other and connected in said impulse-transmitting circuit, drive means for periodically adjusting said impedance member over an impedance range including the balance adjustment, one of said electrode members being coupled with said adjustable impedance member to move in synchronism with said periodic adjustment, contact means arranged for controlling said impulse-transmitting circuit and having a movable intermediate contact associated with said zero instrument and two stationary outer contacts connected with said condenser and said current source respectively to discharge said condenser through said electrode members at the moment when said zero branch is balanced and to charge said condenser in intermediate periods.

10. An electric system for controlling a mechanism in accordance with a variable control magnitude, comprising in combination, circuit means for supplying said control magnitude, a relay connected with said circuit means, means operatively associated with said relay for balancing the effect of said control magnitude on said relay, said balancing means having a movable member for varying the balancing action of said means on said relay, said mechanism having a movable operating member connected with said movable balancing member, drive means for periodically varying the positions of said two movable members within a range including the balance adjustment of said movable member of said balancing means, a contact device forming part of said relay and comprising a movable contact arranged to respond to both said circuit means and said balancing means, and two stationary contacts arranged to limit the movement of said movable contact so as to effect a substantially instantaneous switching over of the latter from one to the other stationary contact when responding to said balance adjustment, a current source and a condenser connected with said movable contact and one of said stationary contacts to accumulate a current charge in said condenser when said movable contact engages said one stationary contact, and a control circuit connecting said other stationary contact and said condenser with said movable operating member of said mechanism so as to be rendered operative by said movable contact member when the latter member switches over to said other stationary contact, whereby in turn said movable operating member of said mechanism is rendered operative by said control circuit for rendering at the point of periodic travel of said movable mechanism member where said relay responds to the balance condition then adjusted by said movable member of said balancing means.

11. An electric system for controlling a mechanism in accordance with a variable control magnitude, comprising in combination, a relay, circuit means for providing said control magnitude, said circuit means being connected with said relay, variable means for balancing the effect on said relay of said circuit means due to said control magnitude so as to have said relay respond to the balance condition, said mechanism having a periodically movable operating member, means for periodically varying the adjustment of said variable balancing means in synchronism with the periodic movement of said mechanism member, a control device having a movable element associated with said relay so as to be actuated thereby and two stationary elements arranged to limit the movement of said movable element for effecting a substantially instantaneous switching over of the latter from one to the other stationary element when said relay responds to said balance adjustment, current supply means for producing a current surge in order to energize said movable mechanism member, said current supply means being connected through said control device with said movable mechanism member so as to be controlled by said control device in response to the switching over of said movable element of said control device from one to the other of said stationary elements, whereby said movable mechanism member is rendered operative by a current surge from said current supply means at the point of the periodic travel of said mechanism member where said movable element of said contact device responds to the balance condition then adjusted by said variable balancing means.

12. An electric system for actuating a mechanism in accordance with a variable control magnitude, comprising a balanceable circuit arrangement comprising variable circuit means for supplying said control magnitude, an adjustable impedance member to establish balance conditions, and a control device having a balance-responsive movable contact and two stationary contacts arranged to limit the movement of said movable contact so as to effect a substantially instantaneous switching over of the latter from one to the other stationary contact when responding to said balance conditions, in combination with drive means for periodically varying the adjustment of said impedance member within a range including the balance adjustment, said mechanism having a movable actuating member mechanically connected with said impedance member to move synchronously with said latter member, and an impulse-transmitting circuit controlled by said control device and connected with said movable member of said mechanism, said circuit containing a condenser and a voltage source for charging said condenser and being connected with said movable contact and said stationary contacts so that said condenser is charged when said movable contact engages one of said stationary contacts and discharged through said movable mechanism member when said movable contact switches over to said other stationary contact, whereby said movable member is rendered electrically operative at the point of its periodic travel which corresponds to the balance position of said impedance member.

13. An indicating, recording or controlling measuring system, comprising a measuring network having variable circuit means for supplying a primary control magnitude, an adjustable impedance member, and a measuring device responsive to said control magnitude of said circuit means and to the impedance magnitude of said impedance member, in combination with contact means associated with said measuring device and an impulse-transmitting circuit connected with said contact means to be controlled by said measuring device in response to said network being adjusted by said impedance member to a given relation of said magnitudes, a mechanism to be controlled in accordance with said primary control magnitude, said mechanism having two cooperative electrode members movable relative to each other and connected in said impulse-transmitting circuit, said electrode members forming a gap between each other, drive means for periodically adjusting said impedance member over an impedance range including the adjustment according to said given relation, one of said electrode members being coupled with said adjustable impedance member to move in synchronism with said periodic adjustment, whereby said two members of said mechanism are energized by said impulse-transmitting circuit passing a current through said gap at a point of the relative travel of said electrode members which corresponds to said adjustment of said impedance member to said given relation.

14. In an alternating current system, the combination of a balanceable network having means for supplying an AC voltage, a branch containing variable circuit means for producing a control magnitude, a zero branch, an adjustable impedance member to balance said zero branch, and a dynamometric relay having a moving coil connected in said zero branch and a field coil connected with said AC supply means so as to be energized in accordance with said voltage and in a suitable phase relation thereto, a mechanism arranged to be controlled in accordance with said control magnitude and having a movable actuating member coupled with said adjustable impedance means to be adjusted in synchronism therewith, drive means for periodically varying the adjustment of said impedance means over a range including the balance adjustment, a contact device forming part of said relay and comprising a movable contact and two stops for limiting the path of said movable contact to effect a substantially instantaneous switching over of the latter when said relay responds to balance conditions in said zero branch, and an impulse-transmitting circuit controlled by said contact device and connected with said movable mechanism member to energize the latter when said relay responds to balance conditions in said zero branch.

15. An electric system for recording a variable control magnitude, comprising in combination, a relay, circuit means for providing said control magnitude, said circuit means being connected with said relay, variable means for counteracting the effect on said relay of said circuit means due to said control magnitude so as to have said relay respond to a given magnitude of a differential action, a recording device having two electrode members forming an interstitial gap between each other and being movable relative to each other, means for periodically moving one of said electrode members relative to said other member and for adjusting said variable circuit means in synchronism to said electrode movement, a contact device having a movable element associated with said relay so as to be actuated thereby, and two stationary elements arranged to limit the movement of said movable element for effecting a substantially instantaneous switching over of the latter from one to the other stationary element when said relay responds to said given magnitude, a control circuit comprising a current source and connecting said contact device with said two electrode members to pass a current across said electrode gap at the point of said relative periodic movement of said electrode members where said movable element of said contact device switches over, whereby said recording device is caused to effect a recording operation at said point.

GEORGE KEINATH.